(No Model.)

E. P. WOOD.
WINDOW DRESSING DEVICE.

No. 576,016. Patented Jan. 26, 1897.

Witnesses.

Inventor,
Elsina P. Wood,
by John Wedderburn
Atty.

UNITED STATES PATENT OFFICE.

ELSINA P. WOOD, OF GLEN HAVEN, WISCONSIN.

WINDOW-DRESSING DEVICE.

SPECIFICATION forming part of Letters Patent No. 576,016, dated January 26, 1897.

Application filed June 20, 1896. Serial No. 596,302. (No model.)

*To all whom it may concern:*

Be it known that I, ELSINA P. WOOD, a citizen of the United States, residing at Glen Haven, in the county of Grant and State of Wisconsin, have invented certain new and useful Improvements in Window-Dressing Devices; and I do hereby declare the following to be a full, clear, and exact description of the invention, such as will enable others skilled in the art to which it appertains to make and use the same.

My invention relates to improvements in window-dressing devices, the object of the same being to provide a simple apparatus to be inserted into the windows of millinery or other shops, which is adapted to contain and hold certain of the articles sold in the store and upon which they can be artistically arranged.

The invention consists of a frame made up of extensible upright and horizontal bars to accommodate it to windows of different sizes, a base-plate, a detachable rod or bar extending upwardly from said base-plate, a series of bowls detachably secured to said rod or bar, and detachable arms secured to said rod, projecting outwardly therefrom and formed with hooks or pins by means of which different articles may be secured in place upon the ends thereof.

The invention also consists in other details of construction and combinations of parts, which will be hereinafter more fully described and claimed.

Figure 1:
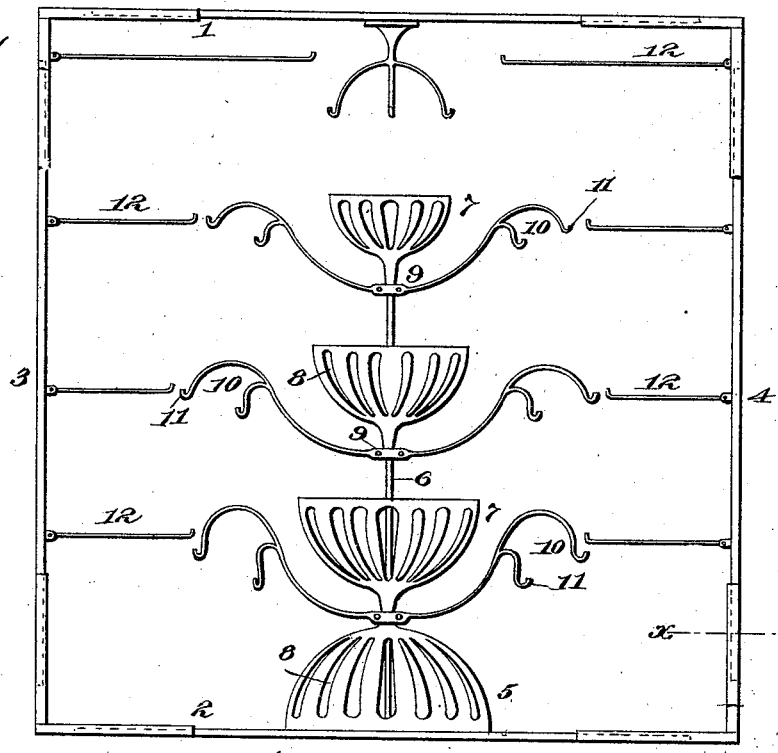
Figure 2:
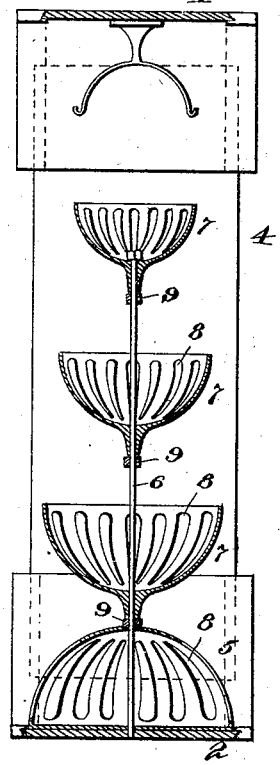
Figure 3:

In the drawings forming part of this specification, Figure 1 represents a front elevation of my device. Fig. 2 is a vertical longitudinal section through the same. Fig. 3 is a section on the line *x x* of Fig. 1, showing the extensible bars of which the frame is made up.

Like reference-numerals indicate like parts in the different views.

The frame of my device is made up of horizontal top and bottom bars 1 2 and vertical side bars 3 4. These bars are made so that they may be extended to any length for the purpose of accommodating the device to show-windows of different sizes. The bars 1 and 2, 3 and 4 may be made extensible in any suitable manner, but I prefer that they be made in separate sections, one of which fits within sockets or grooves of the one next adjacent thereto, so that the parts are adapted to telescope for the purpose of shortening or lengthening the same. Secured to the bottom horizontal bar 2 is a base-piece 5 of ornamental shape, and rising upwardly from the center thereof is a vertical rod or bar 6, upon which is strung a series of bowls 7 7, as clearly shown. The base-piece 5 and the bowls 7 are preferably formed in ornamental shape with openings 8 through the sides thereof. Extending outwardly from the rod 6 at points between each pair of adjacent bowls 7 are detachable arms 9 9, formed with a series of projecting fingers 10 upon their outer ends, which fingers have hooks or securing-pins 11 attached thereto. Similar arms may be secured to the top horizontal beam 1 of the frame and project downwardly over the top of the upright rod 6. Extending inwardly from the side bars 3 4 are a series of supports 12 12, which are respectively hinged to the side bars and are adapted to be folded down out of the way when not in use. These supports are provided for the purpose of hanging dress goods or other material thereupon.

In using my device the same is inserted into the show-window of a millinery-shop or other store, and the articles to be displayed therein are arranged artistically in the bowls 7 7 and are strung upon the projections 10 on the arms 9. The bowls 7 may be constructed of any suitable material and are formed separate, so that should one be broken it may be easily replaced. Three of such bowls have been shown in the drawings, but I do not limit myself to any particular number.

Having now described my invention, what I claim as new, and desire to secure by Letters Patent, is—

1. The herein-described window-dresser, consisting of a frame made up of extensible upright and cross bars adapted to fit a window of any size, a base-piece secured to the lower cross-bar of said frame, a rod or bar rising upwardly from the center of said base-piece, a series of bowls in ornamental shape strung upon said rod or bar and arms extending outwardly from said rod, provided with fingers having hooks or pins upon their outer ends, substantially as and for the purpose set forth.

2. The herein-described window-dresser, consisting of a frame made up of extensible upright and cross bars adapted to fit a window of any size, a base-piece secured to the lower cross-bar of said frame, a rod or bar rising upwardly from the center of said base-piece, a series of bowls in ornamental shape strung upon said rod or bar, arms extending outwardly from said rod, provided with fingers having hooks or pins upon their outer ends and supports for dress goods or other material projecting inwardly from the side bars of said frame and adapted to be folded down out of the way when not in use, substantially as and for the purpose set forth.

In testimony whereof I have signed this specification in the presence of two subscribing witnesses.

ELSINA P. WOOD.

Witnesses:
    Mrs. FRANK KIDD,
    EMERY T. WOOD.